United States Patent Office 3,834,970
Patented Sept. 10, 1974

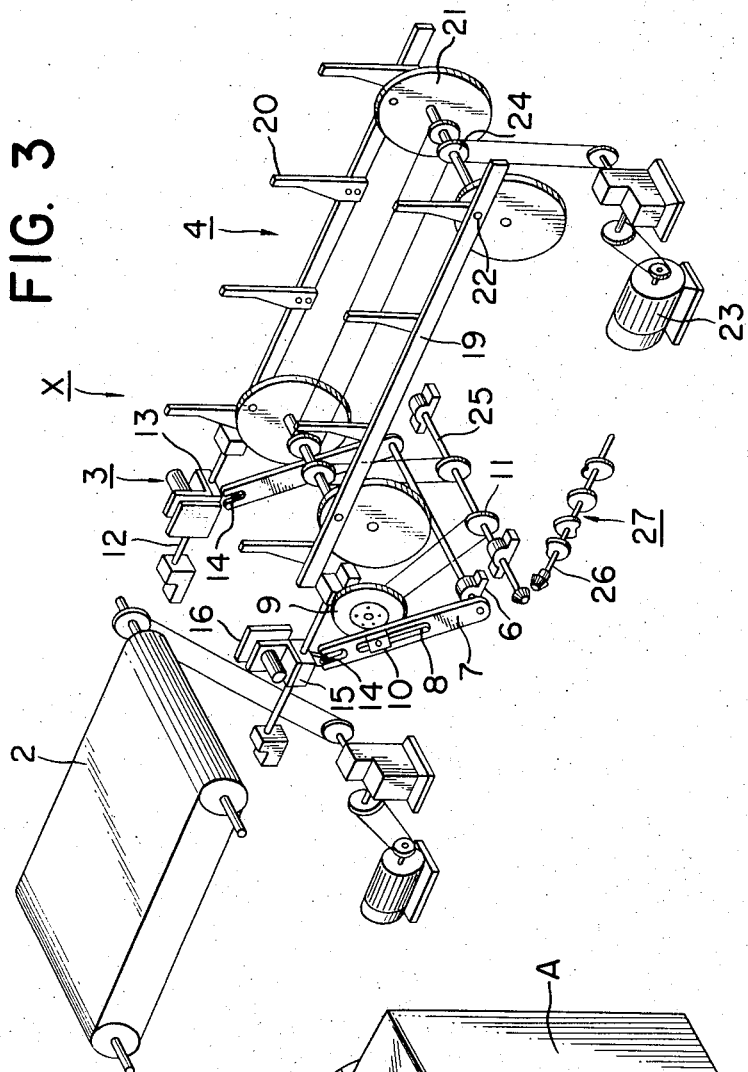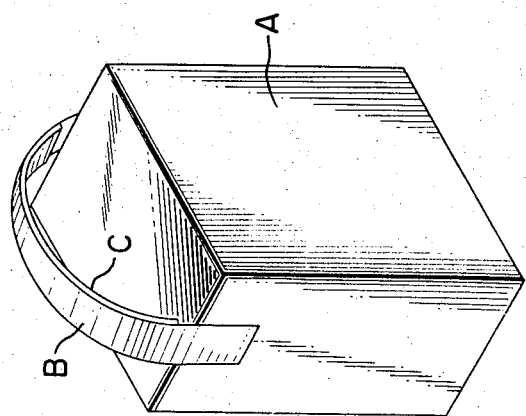

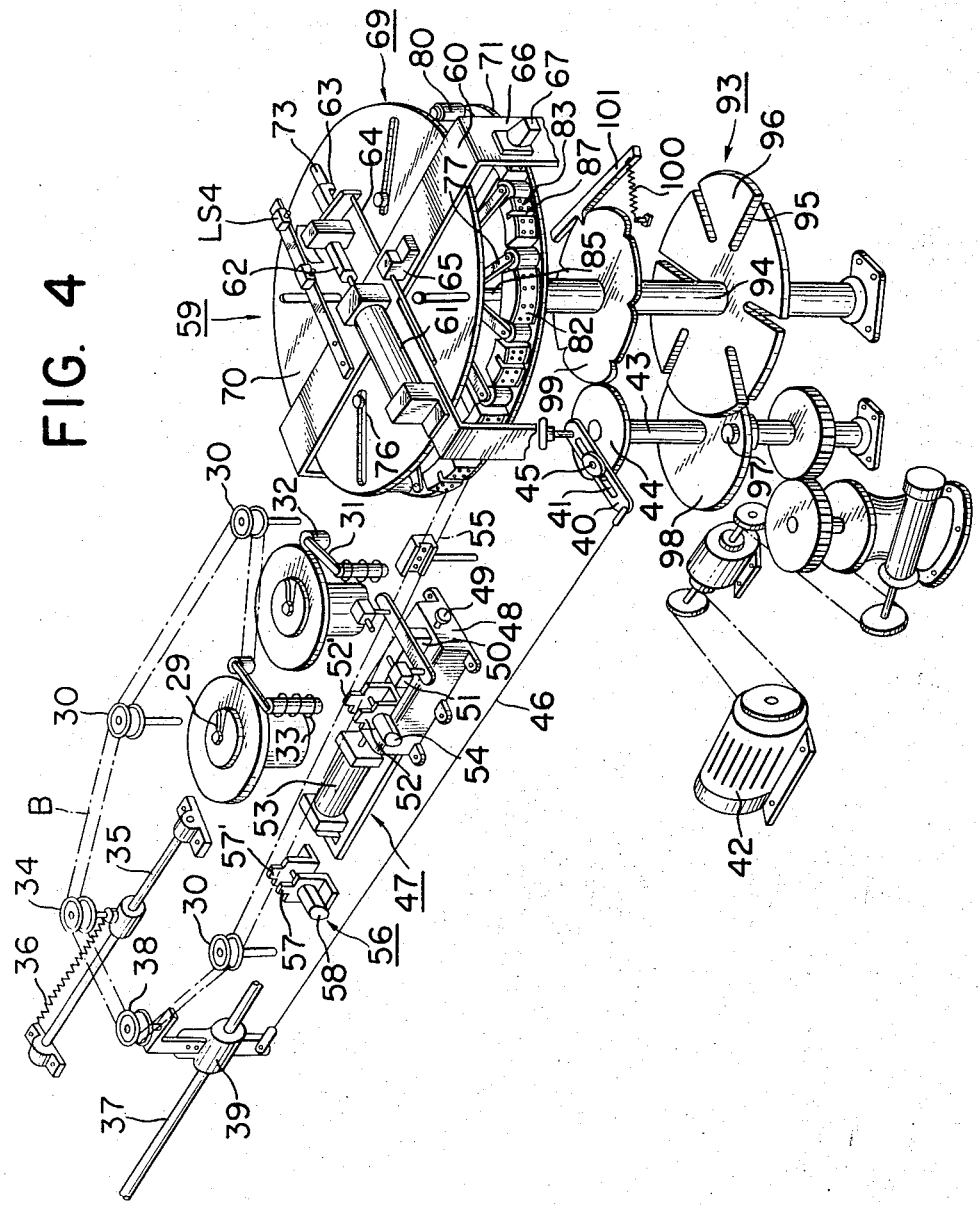

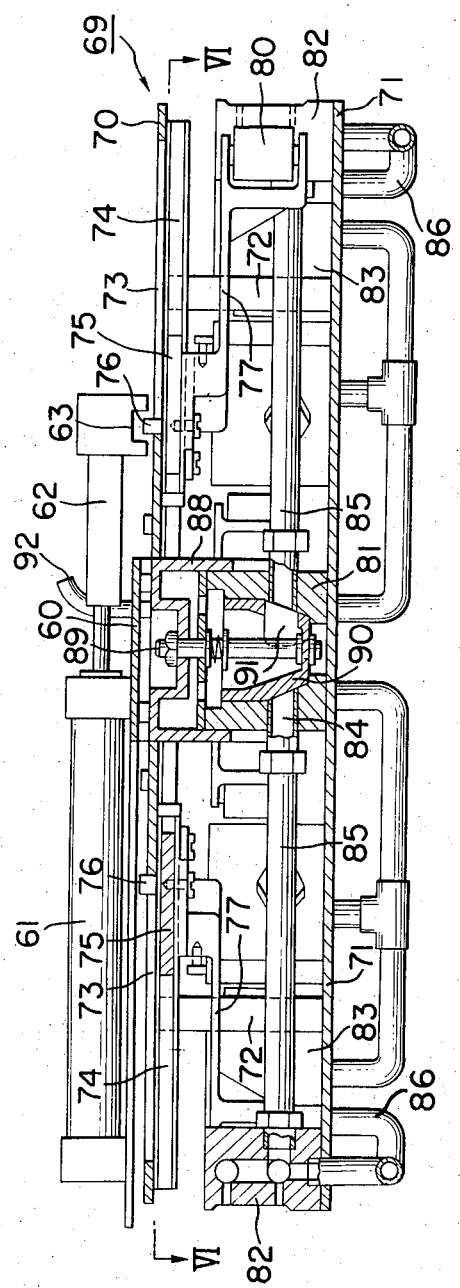

3,834,970
ADHESIVE TAPE STICKING MACHINE
Shigeru Mitsuoka, Tokyo, Tadasaburoh Kaneko, Saitama-ken, and Tetsuo Igarashi, Funabashi, Japan, assignors to Lion Fat & Oil Co., Ltd., Tokyo, Japan
Filed July 3, 1972, Ser. No. 268,868
Claims priority, application Japan, July 2, 1971, 46/48,919, 46/48,920
Int. Cl. B31b 1/86
U.S. Cl. 156—489                4 Claims

ABSTRACT OF THE DISCLOSURE

An adhesive tape sticking machine comprising an intermittent conveying device for an article and a device for sticking a segment of said adhesive tape on said article. The sticking device is provided with an adhesive tape holding reel and a turntable capable of intermittent rotation in concert with the intermittent movement of the article. The turntable has a tape-holding mechanism on its circumference as well as press arms disposed on both sides thereof in movable fashion. A cutter cuts the adhesive tape held to said tape-holding mechanism into pieces of prescribed length, and an actuating mechanism works to thrust out said press arms toward both ends of the cut piece of adhesive tape held in abeyance facing the standing article so as to press and stick said piece to the article.

BACKGROUND OF THE INVENTION (a) Field of the Invention

The present invention relates to a machine for use in sticking adhesive tape to an article—particularly for use in sticking adhesive tape onto both sides of the top of a carton containing powder and the like.

(b) Description of the Prior Art

FIG. 1 of the appended drawings shows an example of an article whereon the adhesive tape has been stuck by means of the tape-sticking machine under the present invention. The article in this example is the carbon A containing powder and the like, and the adhesive tape B lined with an opaque paper carrying notice, advertisement, name of firm, etc. and stuck to the adhesive side by the portion corresponding to the grip sticks to both sides of said article by two ends thereof.

There has never been developed a machine capable of continuously performing the above described sticking job, and therefore, it has so far resorted to manual labor employing simple tools. Consequently, the work efficiency has been extremely poor, and besides, it has been impossible to ensure exact sticking.

SUMMARY OF THE INVENTION

The principal object of the present invention is to provide a machine capable of efficiently and exactly sticking such an adhesive tape as described above to an article.

Another object of the present invention is to provide a machine capable of sticking a piece of adhesive tape cut in a prescribed length to a prescribed place of the article, wherein the adhesive tape is intermittently pulled out of the tape holding reel in concert with the intermittent conveyance of the article, the adhesive tape thus pulled out is cut into a prescribed length, and the thus cut piece of the adhesive tape is thrust onto the article when it faces the article brought to it.

A further object of the present invention is to provide a machine capable of efficiently pulling out and sticking the adhesive tape, which employs a turntable to pull out and stick the adhesive tape, said turntable being provided with the tape-holding mechanism on its circumference and being capable of intermittent rotation with the adhesive tape being held thereto by its non-adhesive side by virtue of said tape-holding mechanism in concert with the conveying device for the article-to-be-stuck, whereby the adhesive tape is cut and stuck to the article-to-be-stuck when it comes to a halt.

A still further object of the present invention is to provide an adhesive tape sticking machine including a pull-out roll which exerts a tension, in such a manner as described later on, to the portion of the adhesive tape staying at standstill extending from said tape holding reel to said turntable, so as to pull out more tape from the tape holding reel by just a predetermined length, in order that the adhesive tape is fed in turn to the turntable only by the same length as pulled-out from the tape holding reel for the purpose of making uniform the length of the cut piece thereof to be stuck onto the article.

Still another object of the present invention is to provide an adhesive tape sticking machine, which is provided with a tape-pinching mechanism to pull back the adhesive tape being at a standstill halfway between the real holding the adhesive tape and the turntable, said tape-pinching mechanism being so devised as to pull back the adhesive tape wound round the turntable, whereby the adhesive tape is always exactly held on the turntable.

BRIEF DESCRIPTION OF THE DRAWINGS

In the accompanying drawings, FIG. 1 is a perspective view of a carton shown as an example of the article to which the adhesive tape is stuck by the use of a machine embodying the present invention.

FIG. 3 is a perspective view of the conveying device for the article-to-be-stuck in the embodiment shown in FIG. 2.

FIG. 4 is a perspective view of the adhesive-tape sticking device in the embodiment shown in FIG. 2.

FIG. 5 is a side-view of the longitudinal section of the turntable in the embodiment shown in FIG. 2.

DETAILED DESCRIPTION OF THE INVENTION

The machine illustrated by FIGS. 2–6 is an embodiment of the present invention, and this is suitable for use in providing the carton A, as shown in FIG. 1, with a grip or handle consisting of a piece of adhesive tape B and a piece of opaque paper C adhering to the intermediate portion of its adhesive side by sticking both ends of said adhesive tape onto both shoulders of the carton, with the intermediate portion spaced from the carton, as shown.

The machine according to the present invention illustrated by the appended drawings may be divided broadly into three constituents: namely, the carton conveying device X, the tape sticking device Y, and the control mechanism Z to control the working of these devices.

Figure 2:
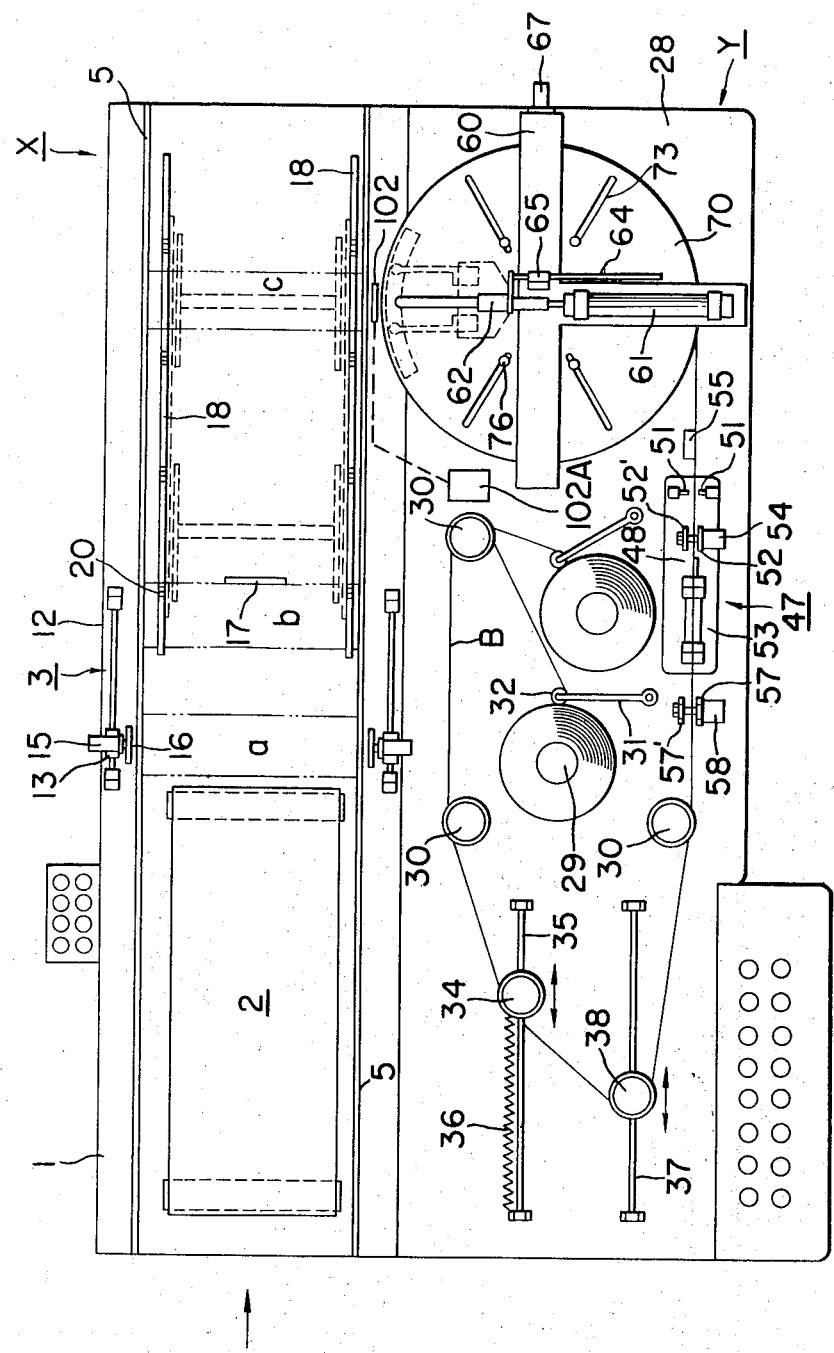
FIG. 2 is a plan of one embodiment of the present invention.
Figure 6:
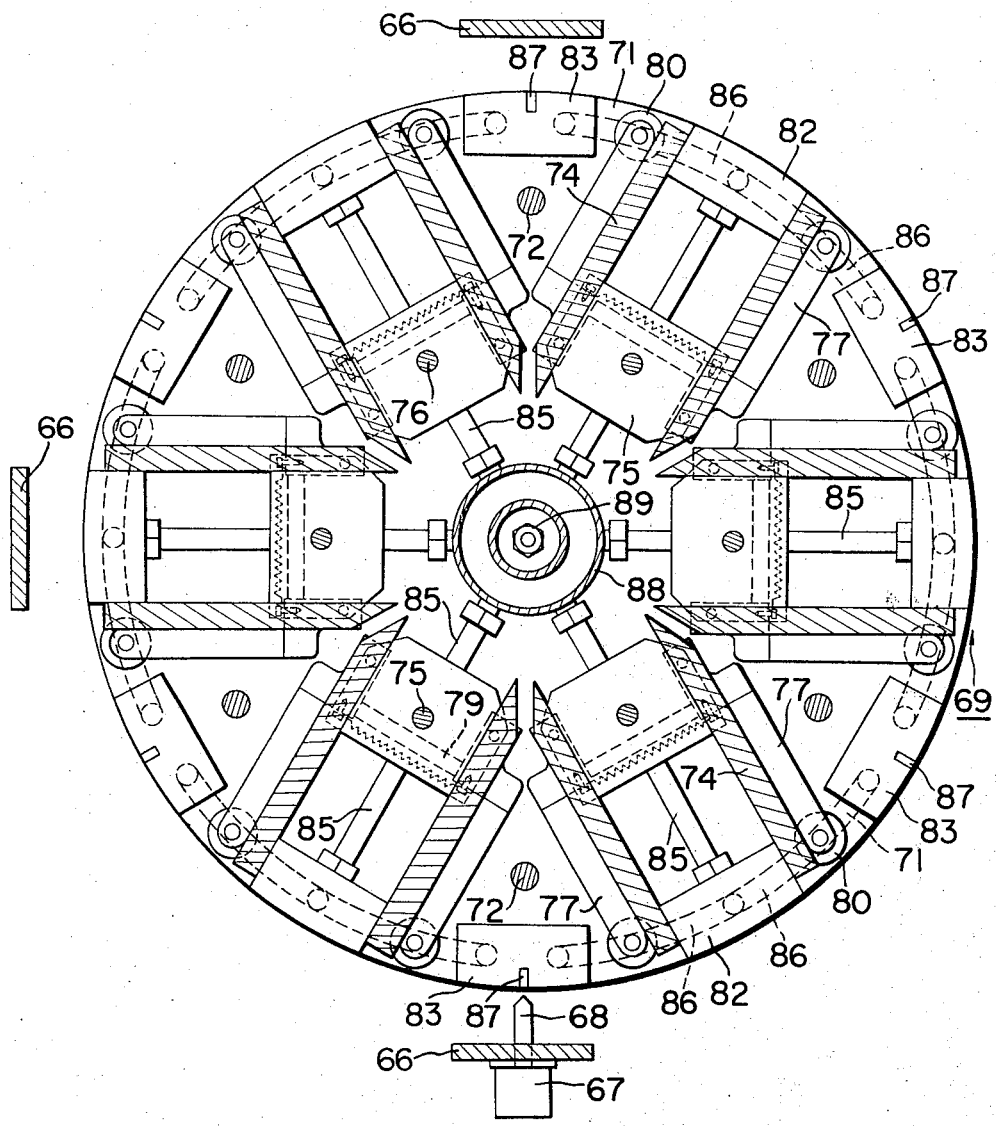
FIG. 6 is a section—as cut along the line VI—VI—of the turntable shown in FIG. 5.

(1) Carton conveying device X (cf. FIGS. 2 and 3)

The belt conveyer 2 with its top side exposed is installed on the left side of the top plate 1, and, to the right of said belt conveyer 2, there are installed the quick feeding mechanism 3 and the comb-like conveyer 4, in order.

The crank pin 10 of the disc 9 rotatable with the pulley 11 to be driven by the motor 23 fits in the slot 8 provided for the lever 7 whose base shaft is pivoted to the bearing 6 fixed on the frame. The lower part of the bracket 13 slidably fitted to the guide rod 12 installed on the top plate extends below the top plate 1 through the slit provided therefor to be connected with the upper end of said lever 7 by means of the pin 14. The air cylinder 15 is provided for the bracket 13 and the holding plate 16 for the purpose of clamping the carton.

In front of this quick feeding mechanism 3, there is provided the stopper 17 running through the slit of the top plate 1 disposed to make a right angle with the direction of movement of the carton A so as to work by virtue of an air cylinder.

The comb-like conveyer 4 consists of the rods or arms 20 which are fixed on the desired number of connecting rods 19 at regular intervals and so devised as to appear and disappear through a couple of slits 18 provided in the top plate 1 along the direction of movement of the carton. The connecting rods 19 are pivoted to the crank pin 22, and the discs 21 are supposed to rotate by virtue of the pulley 24 being driven by the motor 23.

A plurality of timing cams 27 are fixed to the following shaft 26 rotatable in concert with the driving shaft 25 to be rotated by the motor 23.

(2) Tape sticking device Y (cf. FIGS. 2 and 4)

The adhesive tape B consists of an adhesive strip with pieces of opaque paper C adhering to its adhesive side at regular intervals, and is wound up into a roll to be mounted on the reel 29 pivoted on the top plate 28.

This reel 29 consists of two units in such a fashion that, immediately before the roll of tape B is completely released, the tape B of the other roll is joined thereto.

On the top plate 28, there is pivoted the guide roll 30, and the pinch roll 32 is pivoted on the tip of the supporting lever 31, which lever is pivoted near the reel 29 on said top plate so as to press against the stripped section of the tape B by means of the spring 33.

The tension roll 34 is provided on the top plate 28, and the bracket of this tension roll 34 slidably fits to the guide rod 35 mounted on the top plate 28 so as to impart the tension to the tape B by means of the spring 36 stretched between this bracket and the bearing for one end of the guide rod 35.

Parallel with said guide rod 35, the guide rod 37 is mounted, and the bracket 39 of the pull-out roll 38 slidably fits on this guide rod 37. On the other hand, the crank pin 45 provided for the disc 44 fixed to the driving shaft 43 and rotated by the motor 42 fits slidably in the slit 41 provided in the lever 40, which lever is pivoted on the frame. The bracket 39 and the free end of the lever 40 are connected by means of the rod 46.

The tape B pulled out by said pull-out roll 38 is supposed to pass the tape adjusting mechanism 47. This tape adjusting mechanism is as follows:

The casing 48 is mounted on the top plate 28, and the adjusting screw 49 is held on this casing lengthwise in rotatable fashion. The extension of the lower part of the bracket 50 slidably installed on the casing 48 is connected with said adjusting screw 49 screwed therein, while its upper part is equipped with a couple of phototubes 51 disposed face to face with the tape B interposed therebetween. In the rear of said phototubes, there are slidably mounted the pinch plates 52, 52' on the casing 48, and the pinch plate 52 is connected with the air cylinder 53 equipped on the casing 48. The pinch plate 52 is provided with the air cylinder 54 whose actuating rod runs through the pinch plate 52 to be fixed on the other pinch plate 52' by its tip.

In front and to the rear of the foregoing tape adjusting mechanism, there are provided the suction plate 55 and the tape pinch mechanism 56, respectively. This tape pinch mechanism 56 consists of a couple of pinch plates 57, 57' similar to the foregoing pinch plates 52, 52' and the air cylinder 58.

The tape sticking mechanism 59 is provided in front of said suction plate 55. This tape sticking mechanism is as follows:

The T-shaped frame 60 is installed on the top plate 28, and one wing of this frame is mounted with the air cylinder 61 whose actuating rod 62 is provided with the groove 63 formed in the bottom of its end. The guide rod 64 is fixed to this actuating rod 62 in parallel therewith and runs through the bearing 65 equipped on the frame 60. The strut 66 of another wing disposed at a right angle to said air cylinder 61 of the frame 60 is provided with a cutter 68 equipped with the air cylinder 67.

The turntable 69 is disposed inside the foregoing frame 60, and this turntable 69 consists of an upper plate 70, a lower plate 71, and struts 72 to interconnect these plates.

The upper plate 70 is provided with six radial slits 73 disposed thereon at regular intervals, and its back is provided with the guide rails 74 disposed parallel to the slit 73. The sliding piece 75 slidably fits to the guide rails 74, and the guide pin 76 is equipped on top of this sliding piece 75. This guide pin 76 projects above the upper plate 70 through the slit 73. The basic ends of a pair of press arms 77 are pivoted on opposite sides of the sliding piece 75, and the pair of press arms 77 are pulled by the spring 78 connected therebetween to engage with the stopper 79 to thereby maintain a fixed interval, while the roll 80 is pivoted on its tip.

On the surface of the lower plate 71, there is provided the cylindrical valve seat 81 fixed to the center thereof, and the circular rim of said plate is provided with the vacuum pads 82, 83 fixed on the position agreeing with the slits 73 of the upper plate 70 as well as in the middle of such positions, respectively. The opening 84 perforated on the surrounding wall of the valve seat 81 and the vacuum pad 82 are interconnected by means of the pipe 85. The rounded outer surfaces of the vacuum pads 82, 83 are provided with suction holes connecting the inner suction room with the outside. The suction room of the vacuum pad 83 of these pads is divided into the right and left chambers by means of a bulkhead, and the right chamber of vacuum pad 83 is connected with the left chamber of another vacuum pad 83 across the vacuum pad 82 by means of the pipe 86. The rounded external surface of the vacuum pad 83 is provided with the slot 87 disposed almost in the center thereof to engage with the cutter 68.

The cover 88 closely fits to the valve seat 81 in slidable fashion. This cover 88 is fixed to the frame 60, and the valve 90 is installed on the central shaft 89 fixed to this cover 88. The surrounding wall of the lower part of this valve 90 is provided with the segment hole 91 which is devised to be connected with about three openings 84 located at the position for effectuating the tape sticking. The cover 88 is connected with the pipe 92 leading to the vacuum pump not shown in the present drawings.

The turntable 69 is to be rotated intermittently by means of the Geneva mechanism 93 (FIG. 4). On the following shaft 94, there is fixed the follower 96 having six radial slots 95 disposed on its circumference, and the driver 98 provided with the pin 97 devised to fit in this slot 95 is rotated by means of the motor 42. The disc 99 whose circumference is provided with notches disposed to agree with the slots 95 is fixed on the following shaft 94, and the click of the stopper 101 is supposed to fit in the notch by virtue of the spring 100.

Further, a stop plate 102 (FIG. 2) is provided capable of vertical movement by virtue of an air cylinder diagrammatically indicated at 102A. The plate 102 projects through a silt in the top plate of the carton conveying device X at the position for effectuating the tape sticking operation.

(3) Control mechanism Z

Figure 7:
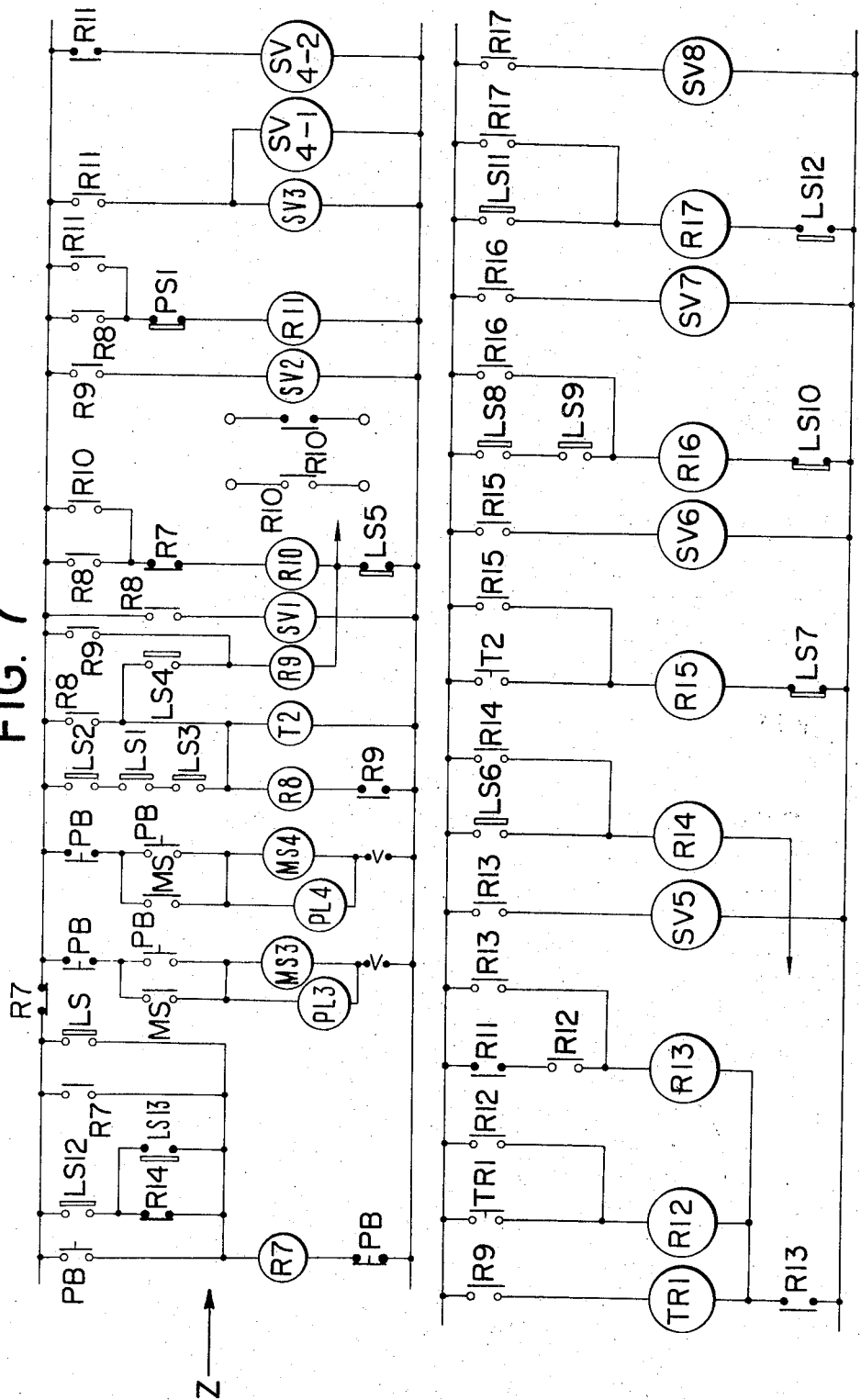
FIG. 7 is a circuit diagram of the control mechanism.

As the control mechanism Z in the present invention, an electric control mechanism comprising the limit switch, the timer and the relay as shown in FIG. 7 is adopted.

Hereunder will be elucidated the function of the foregoing control mechanism.

Referring to FIG. 2, when the carton A being conveyed by the conveyer 2 reaches the location $a$, the switch LS8 to detect the carton and the timing switch LS9 for use in clamping the carton provided on the shaft of the comb-like conveyer 4 come to be on, and the solenoid valve SV7 works. By virtue of the working of the cylinder 15, the holding plate 16 advances to hold the carton A, and, at this juncture, the switch LS11 is on.

The holding plate 16 thus holding the carton A moves the carton A to the location b shown in FIG. 2 with the oscillation of the lever 7 due to the rotation of the disc 9. Prior to this, the switch LS11 is on, the solenoid valve SV8 works, and the stopper 17 ascends. Therefore, this stopper 17 stops the carton A at the location b. At this, the switch LS12 is on, the stopper 17 descends, the switch LS10 is on, the cylinder 15 makes reverse movement, the holding plate retires, and the carton A is released.

At this juncture, the rods 20 of the comb-like conveyer 4—which advance while ascending through the slit of the top plate 1 with the rotation of the disc 21 and subsequently retreat while descending—are engaged to convey intermittently the carton A on the top plate 1 to the right successively.

When the carton A thus conveyed reaches the location c, the switch LS1 is on, the switch LS2 is on by virtue of the pin 97 of the driver for the Geneva stop 93, the switch LS3 is on by virtue of the timing cam 27 linked with the shaft of the comb-like conveyer 4, and as a result, the solenoid valves SV1, SV3, SV4–1 and SV6 work.

With the working of the solenoid valve SV1, the air cylinder 61 performs a forward stroke and the actuating rod 62 projects. As a result, the sliding piece 75 provided with the guide pin 76 fitting in the groove 63 of said actuating rod 62 also advances along the guide rail 74'. A tape segment is already held by suction on the pad, which tape segment extends between a pair of adjacent pads 83. Thus, when piece 75 advances, the rolls 80 equipped on the tip of each press arm 77 engage the back of the cut piece of adhesive tape and press the portion of said tape carrying the opaque paper C against the ascended stop plate 102 while pressing the adhesive end portions on both sides of said opaque paper C against two sides of the carton A (which is in position c) to stick thereon.

When the actuating rod 62 works and the switch LS4 disposed in the guide section of the air cylinder 61 is on, the solenoid valve SV1 works reverse to the previous direction, the air cylinder 61 performs a backward stroke, the sliding piece 75 retreats, the switch LS4 is on, the solenoid valve SV2 works reverse to the previous direction to make the cylinder 102A (FIG. 2) perform a backward stroke, and the stop plate 102 descends.

With the working of the solenoid valves SV3 and SV4–1, the cylinders 53 and 54 work, and the pinch plates 52 and 52' hold the tape and retreat to the left in FIG. 2, thereby retightening the tape on the turntable. When the opaque-paper carrying section of the adhesive tape has been detected by the phototube 51 and the switch PS1 is off, the solenoid valve SV3 works reverse to the previous direction, the solenoid valve SV4–2 works, the cylinders 53 and 54 work reverse to the previous direction, the pinch plates 52 and 52' release the tape and move to the right returning to the former position. When the switch PS1 is off, the solenoid valve SV5 works, the cylinder 67 works, the cutter 68 projects to fit in the slot 87 of the vacuum pad 83 and cut the tape held by the vacuum pad 83, and, by virtue of the projection of this cutter 68, the switch LS6 is on.

With the working of the solenoid valve SV6, the cylinder 58 performs a forward stroke, the pinch plates 57 and 57' hold the tape, the lever 40 oscillates to the left in FIG. 4 by virtue of the crank pin 45 of the disc 44 which rotates constantly, the bracket 39 connected with the lever 40 by means of the rod 46 and the pull-out roll 38 supported by this bracket 39 are rapidly moved to the left in FIG. 2, and the tape is rapidly pulled out of the reel 29. When the pull-out roll 38 attains the leftmost position, the switch LS7 is off, the solenoid valve SV6 works reverse to the previous direction to make the cylinder 58 performs a backward stroke, the held tape is released, and subsequently the pull-out roll 38 moves to the right returning to the former position.

When the above described operations are about to conclude, the follower 96 of the Geneva stop 93, that is, the turntable 69 starts rotating counterclockwise, the guide pin 76 which has acted to hold the sliding piece 75 on the actuating rod 62 of the air cylinder 61 gets out of the groove 63 and moves to the right, while the guide pin 76 of the next sliding piece 75 comes to engage with the foregoing groove 63. And, among the three sets of vacuum pads 82, 83 on the right which have been connected to the segment hole 91 of the valve 90 through the opening 84 of the valve seat 81, one set of said pads which has been facing the carton A moves to the right to be disconnected from the vacuum pump, and in place of it, another set located symmetrically therewith comes to be connected with the vacuum pump.

According to the present invention, as described in the foregoing, the adhesive tape segment which serves as the handle or grip of the carton is held by suction to the turntable which rotates intermittently in concert with the intermittent movement of the carton, which tape segment is pressed by the press arms against the carton kept standing in a prescribed place c and stuck exactly to two sides of the carton by both ends of each piece cut off said tape, and a series of these works can be performed continuously and very efficiently without any helping hand.

The present invention is therefore very convenient not only for use in sticking the adhesive tape to serve as the grip for a carton such as exemplified above, but also for use in sticking the adhesive tape for the purpose of sealing and so forth.

Although particular preferred embodiments of the invention have been disclosed hereinabove for the purpose of illustration, it will be understood that variations or modifications thereof which lie within the scope of the present invention as defined by the appended claims are fully contemplated.

What is claimed is:

1. A handle sticking machine comprising:
   a conveying device for an article and having a top plate, conveying device being provided with a mechanism for intermittently conveying such an article placed on the top plate thereof; and
   a device for sticking a handle on said article, said sticking device including:
   a holding reel on which is rolled a long, tape-like transparent material comprising a long series of handle members,
   a turntable capable of intermittent rotation in concert with said intermittent conveyed movement of the article,
   a handle member holding mechanism mounted on the circumference of said turntable,
   pressing means including press arms disposed on both sides of said handle member holding mechanism and movable relative thereto for engaging the handle member held thereon,
   cutter means for cutting the series of handle members held on said handle member holding mechanism to form a piece of predetermined length, said piece having end portions capable of adhesively sticking to said article, and turntable being rotatable to face said handle member piece toward said article,
   actuating means connected to the pressing means for thrusting out said press arms toward and into contact with corresponding end portions of said handle member piece while said handle member piece is held in abeyance facing the stationary article, so as to press and stick said end portions onto the surface of said article to provide a handle thereon, and a stop plate interposed between said article and said actuating means, and means actuable for raising said stop plate between said handle member piece and said article just before said press arms are thrust out and for lowering said stop plate after said press arms are retracted, said stop plate when raised being located for intercepting an intermediate portion of the handle member piece thereagainst to prevent contact thereof with the article and to form said handle.

2. A handle-sticking machine as defined in Claim 1, wherein said device for sticking includes a further top plate, a frame installed on said further top plate, said turntable being disposed below said frame, said actuating means including a press mechanism mounted on said frame for coaction with said press arms, said cutter means including a cutter carried by said frame, said handle member holding mechanism having associated therewith a valve carried by said frame, turntable comprising upper and lower plates and an intermittently rotatable shaft fixed to said plates, said upper plate incorporating radially disposed slits and having sliding pieces disposed therebelow and movable along said slits, said lower plate having a circular rim, said handle member holding mechanism including radically disposed vacuum pads carried by said lower plate adjacent said rim thereof, said lower plate having at the center thereof a valve seat, said valve seat being slidably fitted to said valve, said handle member holding mechanism further including piping connecting said valve seat to said vacuum pads, said press arms normally being parallel and having basic ends including tips on opposite sides of a corresponding vacuum pad and pivotally mounted on a corresponding one of said sliding pieces, said corresponding sliding piece being connectible with said press mechanism for actuating said press arms when said sliding piece is rotated by the turntable into adjacency with said press mechanism.

3. A handle-sticking machine as defined in Claim 1, wherein said long-tape-like transparent material on said holding reel comprises an adhesive tape, and including a pull-out roll disposed between said holding reel and turntable for pulling out the adhesive tape held on said holding reel to a predetermined length.

4. A hande-sticking machine as defined in Claim 1, wherein said long, tape-like transparent material comprises adhesive tape and including means for adjusting the position of the adhesive tape and disposed between said holding reel and said turntable, said adjusting means including means adapted to pinch the trailing portion of the adhesive tape held on said turntable in facing relation with the stationary article and then pull same back by a predetermined extent.

References Cited

UNITED STATES PATENTS

| 1,246,006 | 11/1917 | Stake | 156—486 |
| 2,984,378 | 5/1961 | Gunter | 156—521 |
| 3,334,550 | 8/1967 | Craig | 156—521 |
| 3,576,695 | 4/1971 | Stine | 156—521 |
| 3,654,038 | 4/1972 | Hottendorf | 156—521 |
| 3,673,043 | 6/1972 | Carter | 156—486 |

DOUGLAS J. DRUMMOND, Primary Examiner

M. G. WITYSHYN, Assistant Examiner

U.S. Cl. X.R.

93—8 WA, 36.7; 156—361, 521, 568